US010419330B2

(12) United States Patent
Cheng et al.

(10) Patent No.: US 10,419,330 B2
(45) Date of Patent: Sep. 17, 2019

(54) EXPRESS ROUTE TRANSMISSIONS BETWEEN VIRTUAL MACHINES AND CLOUD SERVICE COMPUTING DEVICES

(71) Applicant: Alibaba Group Holding Limited, Grand Cayman (KY)

(72) Inventors: Gang Cheng, Bellevue, WA (US); Jiesheng Wu, Redmond, WA (US)

(73) Assignee: Alibaba Group Holding Limited, Grand Cayman (KY)

( * ) Notice: Subject to any disclaimer, the term of this patent is extended or adjusted under 35 U.S.C. 154(b) by 581 days.

(21) Appl. No.: 15/216,602

(22) Filed: Jul. 21, 2016

(65) Prior Publication Data

US 2018/0026873 A1    Jan. 25, 2018

(51) Int. Cl.
*H04L 12/707* (2013.01)
*H04L 12/46* (2006.01)
*H04L 29/12* (2006.01)
*H04L 29/08* (2006.01)

(52) U.S. Cl.
CPC .......... *H04L 45/22* (2013.01); *H04L 12/4633* (2013.01); *H04L 12/4641* (2013.01); *H04L 61/2514* (2013.01); *H04L 67/1004* (2013.01)

(58) Field of Classification Search
None
See application file for complete search history.

(56) References Cited

U.S. PATENT DOCUMENTS

| | | |
|---|---|---|
| 2010/0100879 A1 | 4/2010 | Katiyar |
| 2014/0195666 A1* | 7/2014 | Dumitriu ............ H04L 12/4625 709/223 |
| 2014/0207968 A1 | 7/2014 | Kumar et al. |
| 2015/0172075 A1 | 6/2015 | DeCusatis et al. |
| 2016/0099874 A1 | 4/2016 | Hu et al. |
| 2016/0105499 A1 | 4/2016 | Kumar et al. |
| 2016/0234298 A1 | 8/2016 | Takeda et al. |
| 2017/0041223 A1 | 2/2017 | Akashi |
| 2017/0099188 A1 | 4/2017 | Chang et al. |
| 2018/0007123 A1 | 1/2018 | Cheng et al. |

OTHER PUBLICATIONS

Office action for U.S. Appl. No. 15/199,536, dated Jul. 11, 2018, Cheng, "Express Route Transmissions Between Virtual Machines and Cloud Service Computing Devices", 17 pages.
Final Office Action dated Feb. 21, 2019 for U.S. Appl. No. 15/199,536 "Express Route Transmissions Between Virtual Machines and Cloud Service Computing Devices" Cheng, 18 pages.

* cited by examiner

*Primary Examiner* — Jeffrey R Swearingen
(74) *Attorney, Agent, or Firm* — Lee & Hayes, P.C.

(57) ABSTRACT

An apparatus includes a virtual machine (VM) that is accessible via a cloud service. The VM has a virtual switch via which data is routed to and from the VM. The virtual switch is configured to: access an express route flow table which indicates whether a particular front end computing device has previously received a first data packet from the VM, and determine, based on the express route flow table, whether to encapsulate a second data packet from the VM destined for the particular front end computing device for an express route so as to bypass a load balancer of the cloud service.

20 Claims, 10 Drawing Sheets

EXPRESS ROUTE TRANSMISSIONS BETWEEN VIRTUAL MACHINES AND CLOUD SERVICE COMPUTING DEVICES

BACKGROUND

Various types of cloud services with public internet access are hosted inside the datacenters of cloud service providers. For example, cloud services such as web services, storage, and virtual machines (VMs) for business needs, may be accessible via a cloud service provider. For scalability and robustness purposes, these cloud services are generally behind load balancers so that multiple cloud service computing devices share the traffic load. That is, the cloud service computing devices' incoming traffic and outgoing traffic typically goes through the load balancers.

In addition, businesses and individuals are increasingly relying on VMs hosted in cloud service providers' datacenters for their computing needs. These VMs may access the public cloud services hosted in the same region and/or in the same datacenter, thereby imposing a greater traffic load on the load balancers. To account for increasing traffic loads on the load balancers, cloud service providers may be required to correspondingly increase the total capacity of the load balancers, which can be expensive.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Figure 1:
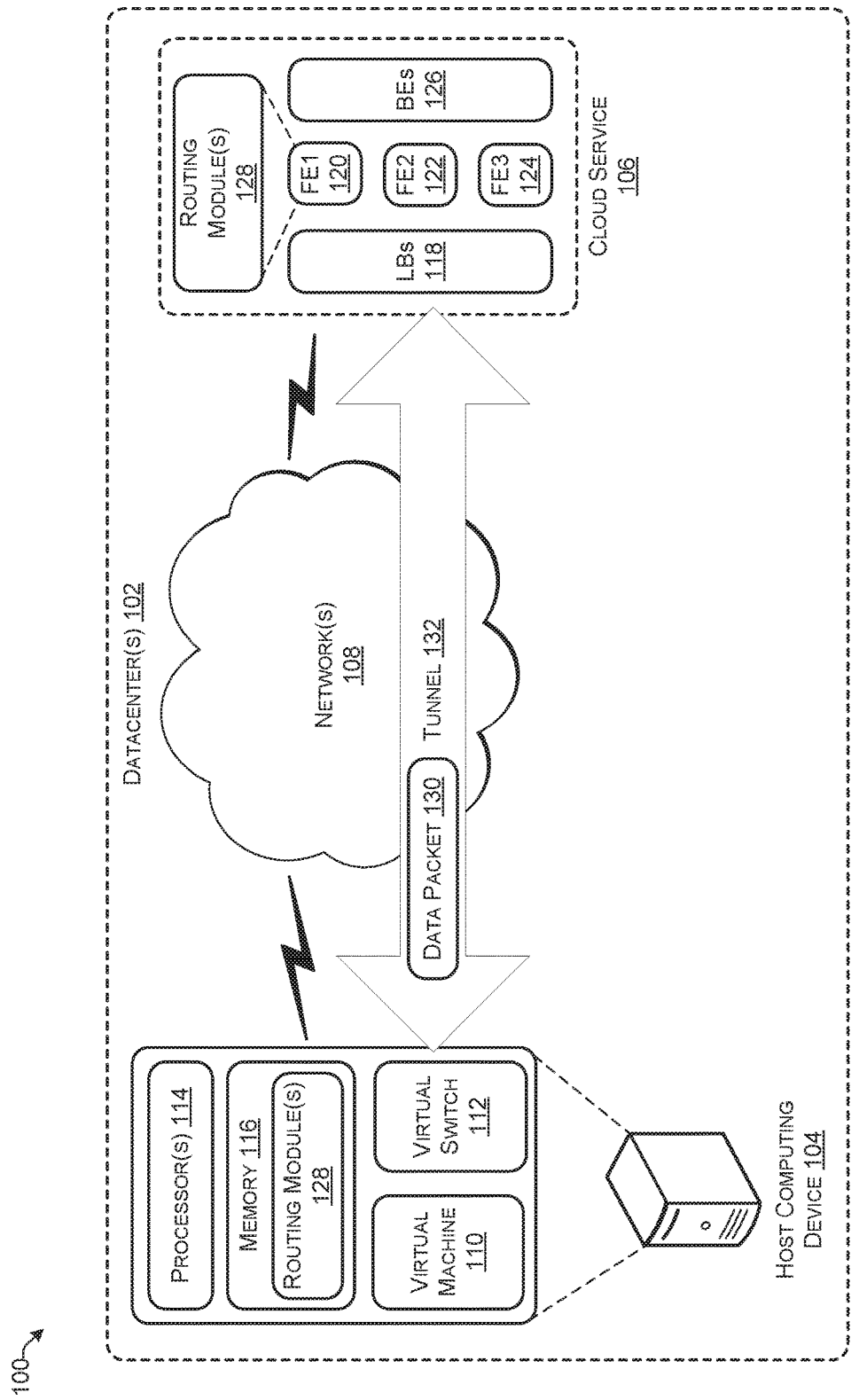
FIG. 1 illustrates an example environment for transmitting data between a virtual machine (VM) and a cloud service computing device via an express route and/or a direct return route according to some implementations.

This disclosure describes, in part, techniques for transmitting data between virtual machines (VMs) and cloud service computing devices. In various implementations, the techniques described herein may include transmitting data from a VM to a cloud service computing device (e.g, a front end computing device of the cloud service) via an express route that bypasses one or more load balancers of the cloud service. Additionally or alternatively, the techniques described herein may include transmitting data from the cloud service computing device to the VM via a direct return route that bypasses one or more load balancers of the cloud service. In various examples, a cloud tunneling protocol (e.g., Virtual Extensible LAN (VXLAN)) may be utilized to transmit data between the VM and the cloud service computing device via a route that bypasses one or more load balancers of the cloud service.

As used herein, a data packet (or data transmission) and/or a route (e.g., an express route, a direct return route, etc.) "bypassing" one or more load balancers means that the data packet and/or the route do not interact with, engage, or otherwise go through the one or more load balancers such that the data packet and/or the route do not impose a network traffic load on the one or more load balancers.

In some implementations, a VM may be hosted by a host computing device in a datacenter. For instance, the host computing device may reside in a datacenter of a cloud service provider. The datacenter may further host, among other things, various computing devices that provide one or more cloud service resources. In some cases, a cloud service may include one or more load balancers, one or more front end computing devices, and one or more back end computing devices.

In some non-limiting examples, a user of the VM may desire to access cloud service resources. The VM may send a first data packet to the cloud service. For instance, the first data packet may include a request for information from the cloud service. A switch (e.g., a virtual switch) may receive the first data packet. The switch may access a flow table that indicates one or more computing devices that are designated as express route destinations. In some cases, computing devices that are designated as express route destinations include computing devices that are capable of receiving data packets via an express route that bypasses one or more load balancers.

The first data packet may include a destination internet protocol (IP) address. The switch may determine, based on the flow table, that the destination IP address of the first data packet does not correspond to a computing device that is designated as an express route destination. As a result, the switch may forward the first data packet to the cloud service via a route that goes through a load balancer (e.g., a software load balancer) before reaching a front end computing device. That is, the switch may determine to not transmit the first data packet via the express route that bypasses the one or more load balancers. In some cases, the route that goes through the one or more load balancers may be considered a default route.

Before sending the first data packet, the switch may encapsulate the first data packet based on a tunneling protocol to produce an encapsulated first data packet. For instance, the tunneling protocol may be a cloud tunneling protocol, such as VXLAN. The encapsulated first data packet may include a tunneling protocol ID, such as a VXLAN ID. In some cases, the tunneling protocol ID may be associated with one or more cloud services. For example, the tunneling protocol ID may be a global VXLAN ID that is associated with the cloud service.

The load balancer of the cloud service may receive the encapsulated first data packet from the switch. The load balancer may determine a front end computing device as a destination of the encapsulated first data packet. In some examples, the load balancer may perform a destination network address translation (DNAT) for the encapsulated first data packet to produce a DNAT first data packet. In performing the DNAT, the load balancer may replace a first destination IP address with a second destination IP address. For instance, the load balancer may replace a public IP address associated with the cloud service with a private IP address associated with the front end computing device.

The load balancer may forward the DNAT first data packet to the front end computing device of the cloud service. The front end computing device may send a second data packet to the VM. For instance, the second data packet may include information that is responsive to the request received via the first data packet. In some cases, a load balancer may receive the second data packet and then forward the second data packet to the VM. In other cases, as will be discussed in more detail with reference to the figures below, the front end computing device may send the second data packet to the VM via a direct return route that bypasses the one or more load balancers of the cloud service.

Before sending the second data packet, the front end computing device may encapsulate the second data packet based on a tunneling protocol to produce an encapsulated second data packet. For instance, the tunneling protocol may be a cloud tunneling protocol, such as VXLAN. The encapsulated second data packet may include a tunneling protocol ID, such as a VXLAN ID. In some cases, the tunneling protocol ID may be associated with one or more cloud services. For example, the tunneling protocol ID may be a global VXLAN ID that is associated with the cloud service. Furthermore, the tunneling protocol used to encapsulate and/or send the second data packet to the VM may be the same as the tunneling protocol used to encapsulate and/or send the first data packet to the load balancer. However, in some instances, the tunneling protocol used to encapsulate and/or send the second data packet to the VM may be different than the tunneling protocol used to encapsulate and/or send the first data packet to the load balancer.

In various implementations, the switch may receive the encapsulated second data packet from the one or more load balancers before the encapsulated second data packet reaches the VM. The switch may obtain information from the encapsulated second data packet. For instance, the switch may obtain an IP address of the front end computing device from the encapsulated second data packet. The switch may access the flow table to determine whether, based on the IP address of the front end computing device, the front end computing device is indicated in the flow table as an express route destination. The switch may determine that the front end computing device has not yet been designated as an express route destination.

Furthermore, the switch may determine to designate the front end computing device as an express route destination. The switch may modify the flow table such that the front end computing device is indicated as an express route destination, e.g., by adding the IP address of the front end computing device to the flow table. In some cases, the switch may map, in the flow table, the IP address of the front end computing device to the public IP address of the cloud service such that a data packet indicating the public IP address of the cloud service as a destination address may be sent to the front end computing device via an express route that bypasses one or more load balancers of the cloud service.

Similarly, subsequent data packets may be sent between the VM and the front end computing device of the cloud service via an express route that bypasses one or more load balancers of the cloud service and/or via a direct return route that bypasses the one or more load balancers.

In contrast to conventional approaches, the techniques described herein provide for communication between VMs and cloud service computing devices directly, without going through load balancers. As such, communication between VMs and cloud service computing devices may avoid imposing any traffic load to the load balancers. Therefore, the total bandwidth required of the load balancers may be reduced. Additionally, because the traffic is sent directly between the VMs and the cloud service computing devices, the total latency between the VMs and the cloud service may be reduced and the user experience may be improved.

FIG. 1 illustrates an example environment 100 for transmitting data between a virtual machine (VM) and a cloud service computing device according to some implementations. The environment 100 may include one or more datacenters 102, a host computing device 104, and a cloud service 106. The host computing device 104 may communicate with the cloud service over one or more networks 108. In some cases, the host computing device 104 and the cloud service 106 may reside within the same datacenter 102. Additionally or alternatively, the host computing device 104 and the cloud service 106 may reside within a same geographic region. However, in some instances, the host computing device 104 and the cloud service 106 may reside within different datacenters 102 and/or different geographic regions. Although FIG. 1 depicts a single host computing device 104 and a single cloud service 106, it should be understood that the one or more datacenters 102 may include multiple host computing devices, multiple cloud services, and/or other datacenter resources.

The host computing device 104 may include a virtual machine (VM) 110, a virtual switch 112, one or more processors 114, and/or memory 116. The host computing device 104 may host the VM 110 and the virtual switch 112. However, in some implementations, the host computing device 104 may not host the virtual switch 112. Instead, the host computing device 104 and/or the VM 110 may be in communication with a switch that is external to the host computing device 104.

The cloud service 106 may include one or more load balancers 118 (e.g., one or more software load balancers), front end computing devices (e.g., a first front end computing device 120, a second front end computing device 122, and a third front end computing device 124), and one or more back end computing devices 126. Although FIG. 1 depicts three front end computing devices 120, 122, and 124 for illustrative purposes, it should be understood that the cloud service 106 may include fewer or more front end computing devices.

The front end computing devices 120, 122, and 124 may be in communication with the one or more load balancers 118 and the one or more back end computing devices 126 via one or more networks (not shown). The one or more load balancers 118 may be configured to distribute incoming workloads to the front end computing devices 120, 122, and 124. Furthermore, the back end computing devices 126 may be configured to store and/or provide cloud service resources to the front end computing devices 120, 122, and 124.

The one or more networks 108 (and other networks referred to in the instant application) can include any appropriate network, including a wide area network, such as the Internet; a local area network, such an intranet; a wireless network, such as a cellular network, a local wireless network, such as Wi-Fi and/or close-range wireless communications, such as BLUETOOTH® and BLUETOOTH® low energy; a wired network, including fiber optics and Ethernet; or any other such network, or any combination thereof. Accordingly, the one or more networks 108 may include both wired and/or wireless communication technologies. Components used for such communications can depend at least in part upon the type of network, the environment selected, or both.

The memory 116 of the host computing device 104 may include computer-readable media in the form of volatile memory, such as random-access memory (RAM) and/or non-volatile memory, such as read only memory (ROM) or flash RAM. The memory 116 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media, such as modulated data signals and carrier waves.

The memory 116 may store one or more modules. For instance, the memory 116 may store one or more routing modules 128. The one or more routing modules 128 may provide, at least in part, functionality for transmitting data between the VM 110 and a cloud service computing device (e.g., first front end computing device 120) via an express route that bypasses the one or more load balancers 118 of the cloud service 106. For instance, the VM 110 may send a data packet 130 to the cloud service computing device via a tunnel 132 that is based at least in part on a tunneling protocol. In various examples, the tunneling protocol may comprise Virtual Extensible Local Area Network (VXLAN) technology.

Additionally or alternatively, the one or more routing modules 128 may provide, at least in part, functionality for transmitting data between a cloud service computing device (e.g., first front end computing device 120) and the VM 110 via a direct return route that bypasses the one or more load balancers 118 of the cloud service 106. For instance, the cloud service computing device may send a data packet 130 to the VM 110 via the tunnel 132.

Figure 2:
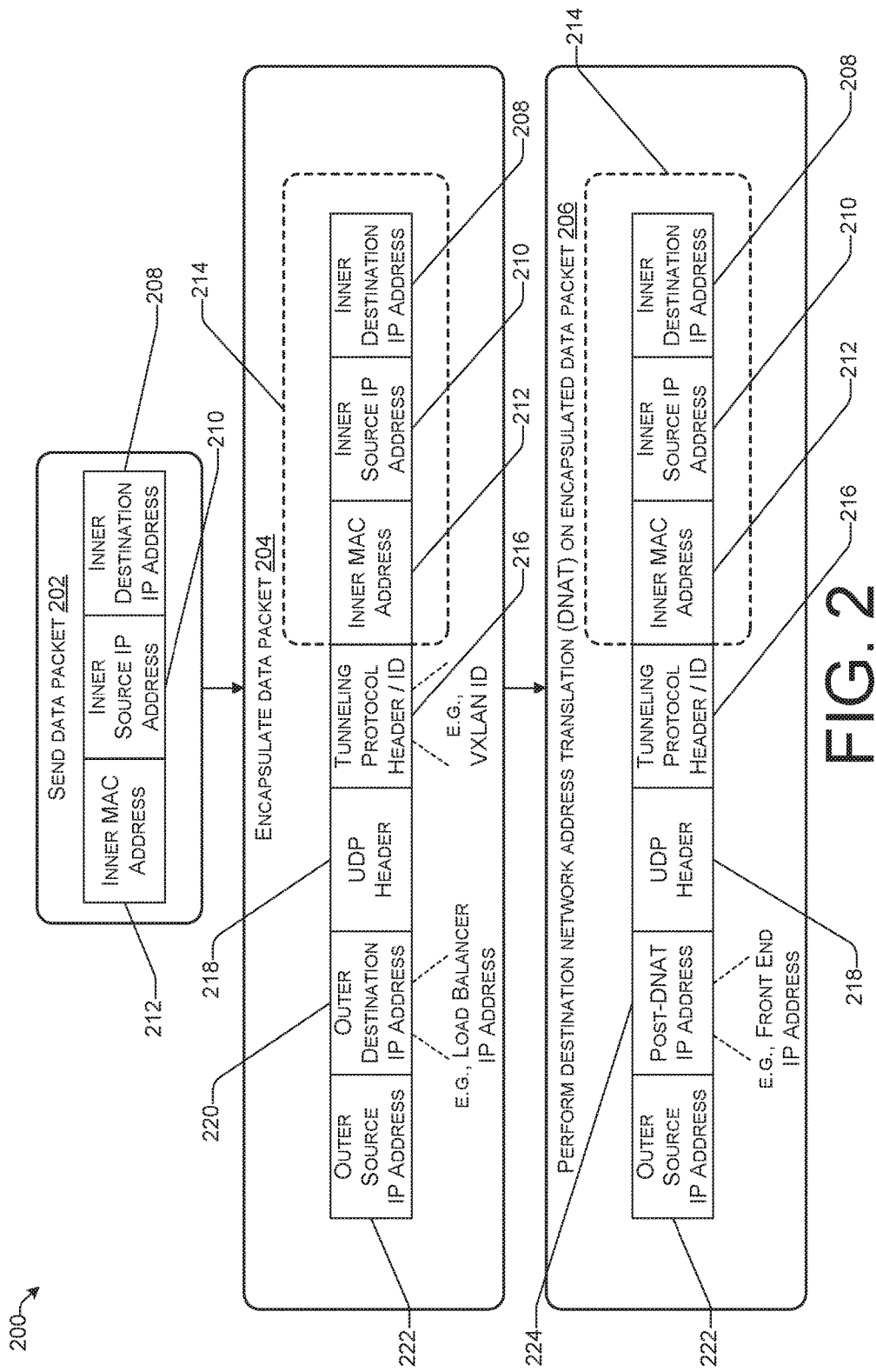
FIG. 2 is a schematic flow diagram illustrating an example process for handling a data packet at various stages of a transmission route between a virtual machine (VM) and a cloud service computing device according to some implementations.

FIG. 2 is a schematic flow diagram illustrating an example process 200 for handling a data packet at various stages of a transmission route between a virtual machine (VM) and a cloud service computing device according to some implementations. The process 200 may include: at 202, sending the data packet; at 204, encapsulating the data packet; and, at 206, performing a destination network address translation (DNAT) on the encapsulated data packet.

At 202, the VM may send the data packet, and the data packet may be destined for the cloud service. The data packet may include a payload (not shown) and one or more fields and/or headers. For example, the one or more fields of the data packet may include an inner destination internet protocol (IP) address 208, an inner source IP address 210, and an inner media access control (MAC) address 212.

At 204, a switch (e.g., a virtual switch) may encapsulate the data packet to produce an encapsulated data packet. The switch may receive the data packet from the VM. The encapsulated data packet may include an inner layer 214 that includes the one or more fields of the data packet. The encapsulated data packet may further include an outer layer of one or more encapsulation fields and/or headers. The one or more encapsulation fields of the encapsulated data packet may include a tunneling protocol header/ID 216 (e.g., a VXLAN ID), a user datagram protocol (UDP) header 218, an outer destination IP address 220 (e.g., a load balancer IP address), and an outer source IP address 222.

At 206, a load balancer may perform the DNAT on the encapsulated data packet to produce a DNAT data packet. The load balancer may receive the encapsulated data packet from the switch. In performing the DNAT, the load balancer may replace a first destination IP address (e.g., outer destination IP address 220) with a second destination IP address (e.g., post-DNAT IP address 224). For instance, the post-DNAT IP address 224 may be an IP address associated with a front end computing device of the cloud service. After performing the DNAT on the encapsulated data packet, the load balancer may forward the DNAT data packet to a cloud service computing device (e.g., the front end computing device of the cloud service).

Figure 3:
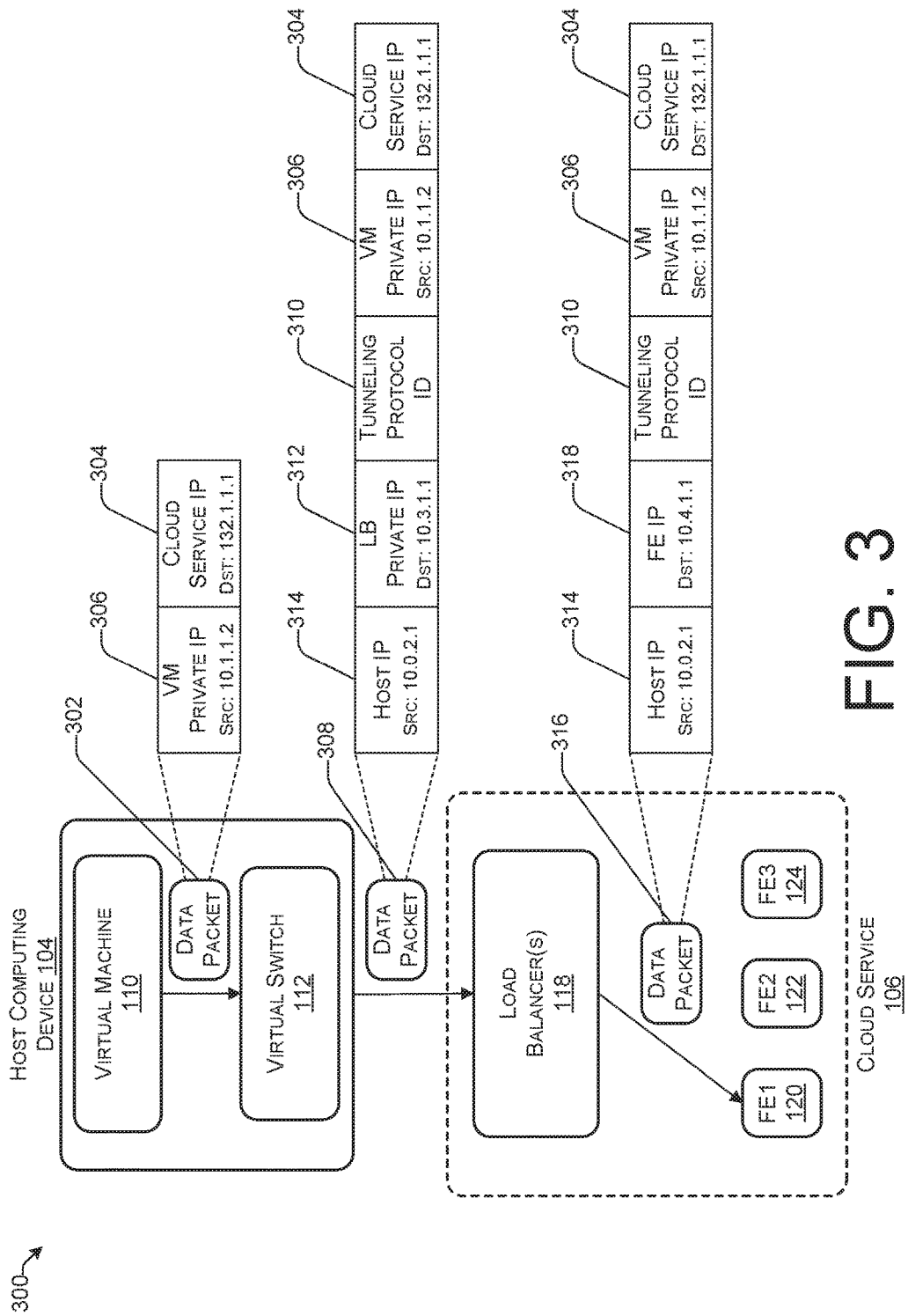
FIG. 3 is a schematic diagram illustrating an example scenario where a tunneling protocol is used to transmit data between a VM and a cloud service computing device via one or more load balancers according to some implementations.

FIG. 3 is a schematic diagram illustrating an example scenario 300 where a tunneling protocol is used to transmit data between a virtual machine (VM) and a cloud service computing device via one or more load balancers according to some implementations. In the example scenario 300, the host computing device 104 may host the virtual machine 110 and the virtual switch 112. Furthermore, the cloud service 106 may include the one or more load balancers 118, one or more front end computing devices (e.g., first front end computing device 120, second front end computing device 122, and third front end computing device 124), and one or more back end computing devices (not shown in FIG. 3).

In some implementations, the virtual machine 110 may generate a first data packet 302. The first data packet 302 may include a payload and one or more fields. For instance, the first data packet 302 may be destined for the cloud service 106. Accordingly, the one or more fields of the first data packet 302 may include, as a first destination internet protocol (IP) address, a cloud service IP address 304. In some cases, the cloud service IP address 304 may be a public IP address associated with the cloud service 106. For instance, in the example scenario 300, the cloud service IP address 304 is indicated as 132.1.1.1, which is a public IP address associated with the cloud service 106.

Furthermore, the one or more fields of the first data packet 302 may include, as a first source IP address, a VM IP address 306. In some cases, the VM IP address 306 may be a private IP address associated with the VM 110. For instance, in the example scenario 300, the VM IP address 306 is indicated as 10.1.1.2, which is a private IP address associated with the VM 110.

The VM 110 may send the first data packet 302 to the virtual switch 112. In some cases, the virtual switch 112 may access a flow table (not shown) that indicates express route destinations. For instance, the virtual switch 112 may check the cloud service IP address 304 against the flow table and determine that the cloud service IP address is not mapped to an express route destination.

The virtual switch 112 may encapsulate the first data packet 302 to produce an encapsulated first data packet 308. In various implementations, the virtual switch 112 may encapsulate the first data packet 302 based at least in part on a cloud tunneling protocol (e.g., a Virtual Extensible Local Area Network (VXLAN) tunneling protocol). The encapsulated first data packet 308 may include the payload of the first data packet 302 and the one or more fields of the first data packet 302. The encapsulated first data packet 308 may further include one or more encapsulation fields. The one or more encapsulation fields of the encapsulated first data packet 308 may include, for instance, a tunneling protocol ID 310 (e.g., a VXLAN ID). In some cases, the tunneling protocol ID 310 may be a global unique VXLAN ID representing express route transmissions between VMs and cloud services. Furthermore, in some examples, the global VXLAN ID may be specific to a cloud service. However, in other examples, the global VXLAN ID may be common to multiple cloud services.

Furthermore, the one or more encapsulation fields may include, as a second destination IP address, a load balancer IP address 312. In some cases, the load balancer IP address 312 may be a private IP address associated with a load balancer 118. For instance, in the example scenario 300, the load balancer IP address 312 is indicated as 10.3.1.1, which is a private IP address associated with the load balancer 118.

Moreover, the one or more encapsulation fields may include, as a second source IP address, a host IP address 314. In some cases, the host IP address 314 may be an IP address associated with the host computing device 104. For instance, in the example scenario 300, the host IP address 314 is indicated as 10.0.2.1, which is an IP address associated with the host computing device 104.

The virtual switch 112 may send the encapsulated first data packet 308 to the load balancer 118 of the cloud service 106. In various implementations, the virtual switch 112 may send the encapsulated first data packet 308 to the load balancer 118 based at least in part on the cloud tunneling protocol.

The load balancer 118 may receive the encapsulated first data packet 308 from the virtual switch 112. After receiving the encapsulated first data packet 308, the load balancer 118 may perform a destination network address translation (DNAT) on the encapsulated first data packet 308 to produce a DNAT first data packet 316. In performing the DNAT on the encapsulated first data packet 308, the load balancer 118 may replace the load balancer IP address 312 with a front end computing device IP address 318. For example, the load balancer 118 may select the first front end computing device 120 as a destination for the encapsulated first data packet 308. The load balancer may, in performing the DNAT on the encapsulated first data packet 308, replace the load balancer IP address 312 with an IP address associated with the first front end computing device 120. For instance, in the example scenario 300, the front end computing device IP address 318 is indicated as 10.4.1.1, which is an IP address associated with the first front end computing device 120.

The load balancer 118 may forward the DNAT first data packet 316 to the first front end computing device 120. In some cases, the DNAT first data packet 316 may include a request from the VM 110. In such cases, the first front end computing device 120 may serve the request.

Figure 4:
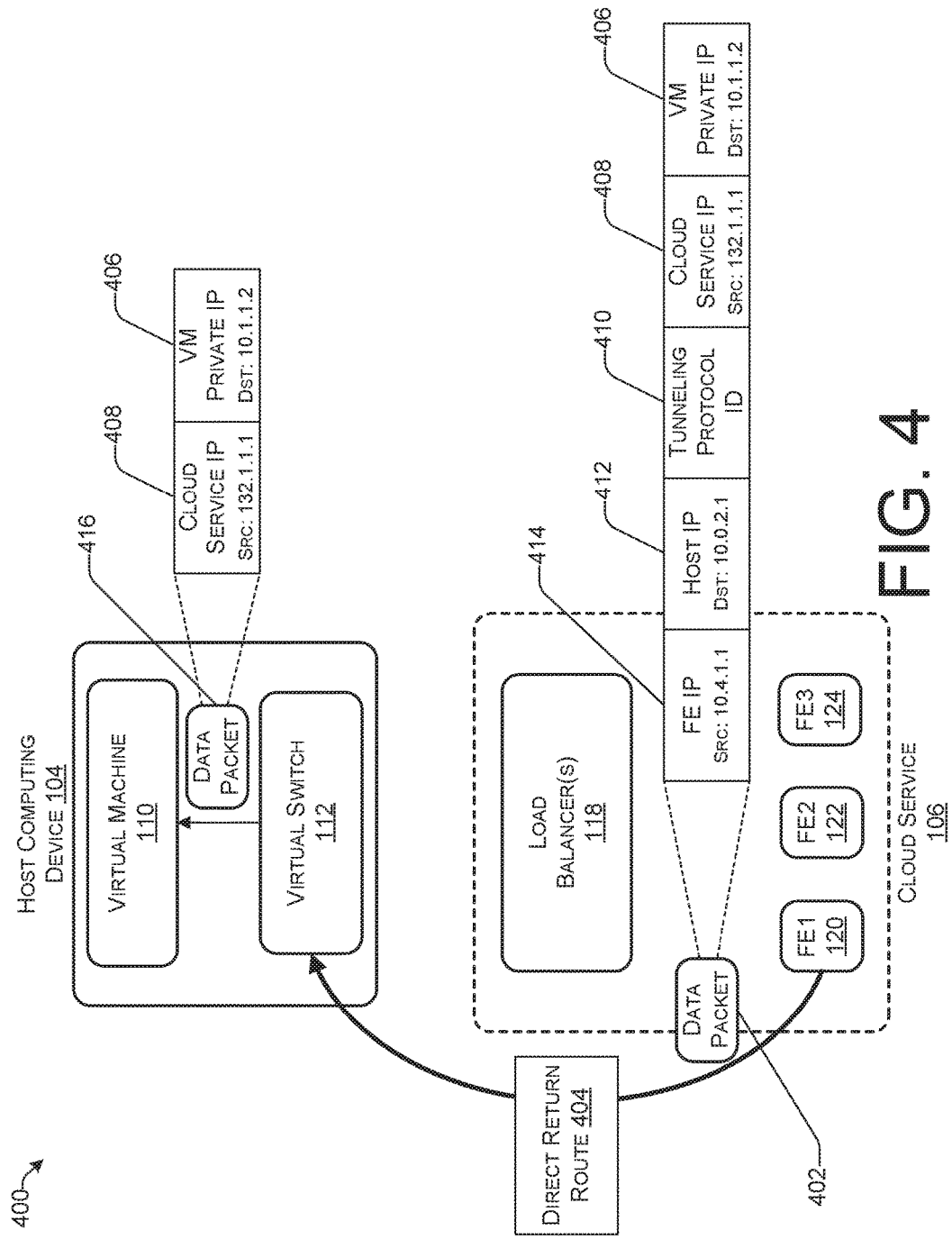
FIG. 4 is a schematic diagram illustrating an example scenario where a tunneling protocol is used to transmit data between a cloud service computing device and a VM via a direct return route according to some implementations.

FIG. 4 is a schematic diagram illustrating an example scenario 400 where a tunneling protocol is used to transmit data between a cloud service computing device and a virtual machine (VM) via a direct return route according to some implementations.

In some implementations, the example scenario 400 may occur during a time period after the first front end computing device 120 receives the DNAT first data packet 316 in scenario 300 of FIG. 3. For instance, the first front end computing device 120 may obtain, from the DNAT first data packet 316, information about the VM 110 and/or the host computing device 104. Accordingly, the first front end computing device 120 may use such information to generate and send data packets directly to the VM 110 via a direct return route, as explained in further detail below.

In various examples, the first front end computing device 120 may generate an encapsulated second data packet 402 based at least in part on a cloud tunneling protocol (e.g., a Virtual Extensible Local Area Network (VXLAN) tunneling protocol). The encapsulated second data packet 402 may include a payload and one or more fields. For instance, the encapsulated second data packet 402 may be destined for the VM 110. Accordingly, the one or more fields of the encapsulated second data packet 402 may include, as a first destination internet protocol (IP) address, a VM IP address 406. In some cases, the VM IP address 406 may be a private IP address associated with the VM 110. For instance, in the example scenario 400, the VM IP address 406 is indicated as 10.1.1.2, which is a private IP address associated with the VM 110.

Furthermore, the one or more fields of the encapsulated second data packet 402 may include, as a first source IP address, a cloud service IP address 408. In some cases, the cloud service IP address 408 may be a public IP address associated with the cloud service 106. For instance, in the example scenario 400, the cloud service IP address 408 is indicated as 132.1.1, which is a public IP address associated with the cloud service 106.

The encapsulated second data packet may further include one or more encapsulation fields. The one or more encapsulation fields of the encapsulated second data packet 402 may include, for instance, a tunneling protocol ID 410 (e.g., a VXLAN ID). In some cases, the tunneling protocol ID 410 may be a global unique VXLAN ID representing direct return transmissions between cloud services and VMs. Furthermore, in some examples, the global VXLAN ID may be specific to a cloud service. However, in other examples, the global VXLAN ID may be common to multiple cloud services.

Furthermore, the one or more encapsulation fields of the encapsulated second data packet 402 may include, as a second destination IP address, a host IP address 412. In some cases, the host IP address 412 may be an IP address associated with the host computing device 104 that hosts the VM 110. For instance, in the example scenario 400, the host IP address 412 is indicated as 10.0.2.1, which is an IP address associated with the host computing device 104.

Moreover, the one or more encapsulation fields of the encapsulated second data packet 402 may include, as a second source IP address, a front end computing device IP address 414. In some cases, the front end computing device IP address 414 may be an IP address associated with the first front end computing device 120. For instance, in the example scenario 400, the front end computing device IP address 414 is indicated as 10.4.1.1, which is an IP address associated with the first front end computing device 120.

The first front end computing device 120 of the cloud service 106 may send the encapsulated second data packet 402 to the VM 104 via a direct return route 404 that bypasses the load balancer 118 of the cloud service 106. The virtual switch 112 may receive the encapsulated second data packet 402. In some cases, the virtual switch 112 may decapsulate the encapsulated second data packet 402 to produce a decapsulated second data packet 416. In decapsulating the encapsulated second data packet 402, the virtual switch 112 may remove the one or more encapsulation fields of the encapsulated second data packet 402.

The virtual switch 112 may obtain information from the encapsulated second data packet 402 and/or the decapsulated second data packet 416. For instance, the virtual switch may use such information to identify the VM 110 as a destination for the encapsulated second data packet 402 and/or the decapsulated second data packet 416. Accordingly, the virtual switch 112 may forward the encapsulated second data packet 402 and/or the decapsulated second data packet 416 to the VM 110.

In some examples, the virtual switch 112 may, after receiving the encapsulated second data packet 402, access a flow table (not shown) that indicates express route destinations. For instance, the virtual switch 112 may check information obtained from the encapsulated second data packet 402 and/or the decapsulated second data packet 416 against the flow table and determine that the first front end computing device 120 is not designated as an express route destination. In some cases, the virtual switch 112 may determine to modify the flow table such that the flow table indicates the first front end computing device 120 as an express route destination. As such, subsequent data packets that are sent from the VM 110 to the cloud service 106 may follow an express route that bypasses the load balancer 118 to reach the first front end computing device 120.

Figure 5:
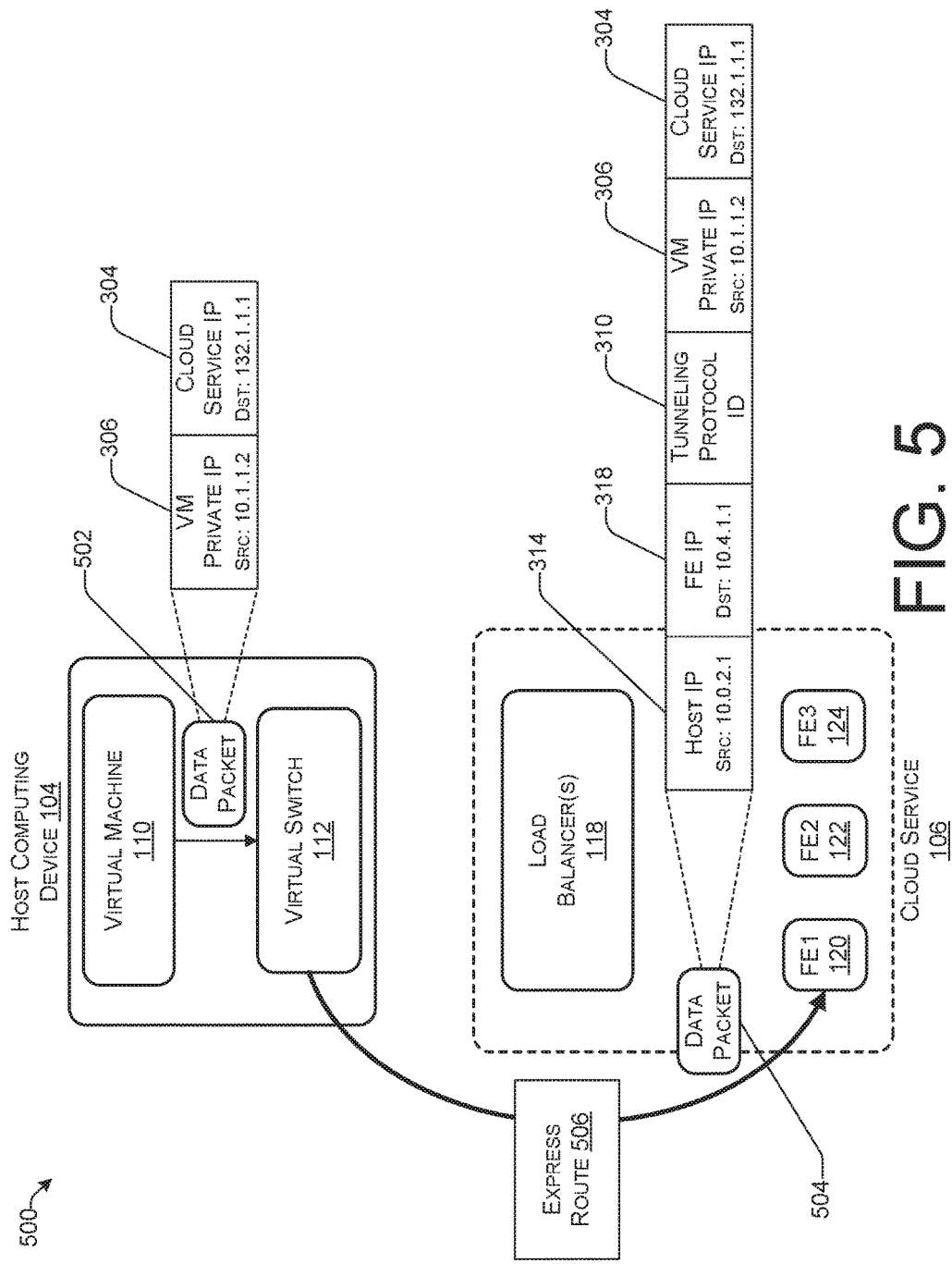
FIG. 5 is a schematic diagram illustrating an example scenario where a tunneling protocol is used to transmit data between a VM and a cloud service computing device via an express route according to some implementations.

FIG. 5 is a schematic diagram illustrating an example scenario 500 where a tunneling protocol is used to transmit data between a virtual machine (VM) and a cloud service computing device via an express route according to some implementations. In some implementations, the example scenario 500 may occur during a time period after the virtual switch 112 modifies the flow table to indicate the first front end computing device 120 as an express route destination, as discussed above in scenario 400 of FIG. 4.

In various examples, the virtual machine 110 may generate a third data packet 502. The third data packet 502 may include a payload and one or more fields. For instance, the third data packet 502 may be destined for the cloud service 106. Accordingly, the one or more fields of the third data packet 502 may include, as a first destination internet protocol (IP) address, a cloud service IP address 304. In some cases, the cloud service IP address 304 may be a public IP address associated with the cloud service 106. For instance, in the example scenario 500, the cloud service IP address 304 is indicated as 132.1.1.1, which is a public IP address associated with the cloud service 106.

Furthermore, the one or more fields of the third data packet 502 may include, as a first source IP address, a VM IP address 306. In some cases, the VM IP address 306 may be a private IP address associated with the VM 110. For instance, in the example scenario 500, the VM IP address 306 is indicated as 10.1.1.2, which is a private IP address associated with the VM 110.

The VM 110 may send the third data packet 502 to the virtual switch 112. In some cases, the virtual switch 112 may access the flow table that indicates express route destinations. For instance, the virtual switch 112 may check the cloud service IP address 304 of the third data packet 502 against the flow table and determine that the cloud service IP address 304 is mapped to an IP address associated with the first front end computing device 120 of the cloud service 106. Accordingly, the virtual switch 112 may determine that the first front end computing device 120 is designated as an express route destination.

Based at least in part on determining that the first front end computing device 120 is designated as an express route destination, the virtual switch 112 may determine to encapsulate the third data packet 502 to produce an encapsulated third data packet 504 and to send the encapsulated third data packet 504 to the first front end computing device 120 via an express route 506 that bypasses the load balancer 118 of the cloud service 106.

In various implementations, the virtual switch 112 may encapsulate the third data packet 502 based at least in part on a cloud tunneling protocol (e.g., a Virtual Extensible Local Area Network (VXLAN) tunneling protocol). The encapsulated third data packet 504 may include the payload of the third data packet 502 and the one or more fields of the third data packet 502. The encapsulated third data packet 504 may further include one or more encapsulation fields. The one or more encapsulation fields of the encapsulated third data packet 504 may include, for instance, a tunneling protocol ID 310 (e.g., a VXLAN ID). In some cases, the tunneling protocol ID 310 may be a global unique VXLAN ID representing express route transmissions between VMs and cloud services. Furthermore, in some examples, the global VXLAN ID may be specific to a cloud service. However, in other examples, the global VXLAN ID may be common to multiple cloud services.

Furthermore, the one or more encapsulation fields of the encapsulated third data packet 504 may include, as a second destination IP address, a front end computing device IP address 318. In some cases, the front end computing device IP address 318 may be an IP address associated with the first front end computing device 120 of the cloud service 106. For instance, in the example scenario 500, the front end computing device IP address 318 is indicated as 10.4.1.1, which is an IP address associated with the first front end computing device 120.

Moreover, the one or more encapsulation fields of the encapsulated third data packet 504 may include, as a second source IP address, a host IP address 314. In some cases, the host IP address 314 may be an IP address associated with the host computing device 104. For instance, in the example scenario 300, the host IP address 314 is indicated as 10.0.2.1, which is an IP address associated with the host computing device 104.

Figure 6:
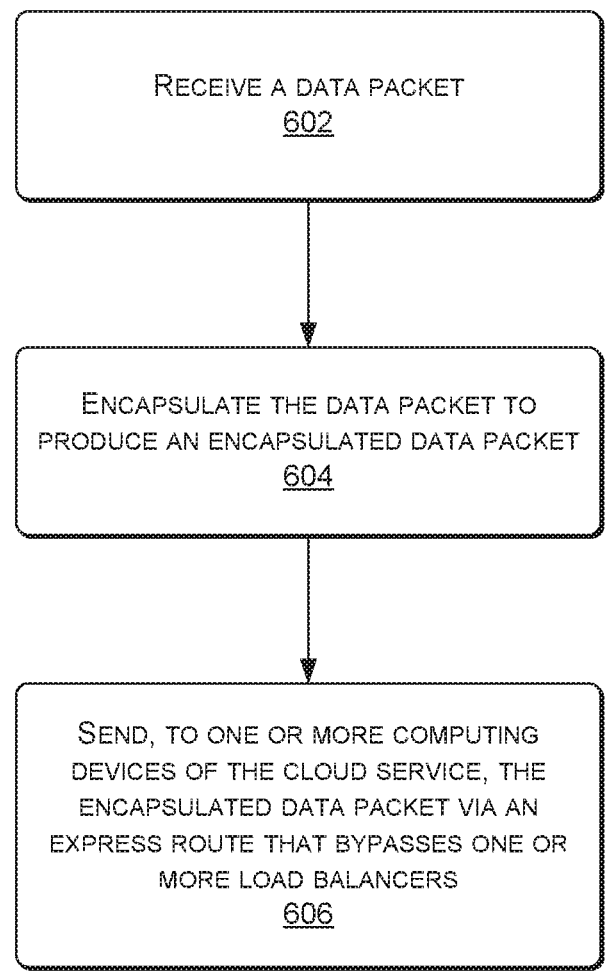
FIG. 6 is a flow diagram illustrating an example process for transmitting data between a virtual machine and a cloud service computing device via an express route according to some implementations

FIG. 6 is a flow diagram illustrating an example process 600 for transmitting data between a virtual machine (VM) and a cloud service computing device via an express route according to some implementations, as further described above with reference to FIGS. 1-5. The process 600 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

At 602, the process 600 may receive a data packet. In some cases, a switch (e.g., a virtual switch) may receive the data packet from a VM, and a cloud service may be the intended destination of the data packet. The data packet may include one or more fields, such as a source internet protocol (IP) address associated with the VM and a first destination address associated with the cloud service. In some instances, the source IP address associated with the VM may be a private IP address of the VM. Furthermore, the first destination address associated with the cloud service may be a public IP address of the cloud service.

The cloud service may include one or more load balancers for distributing workloads among a plurality of computing devices. For instance, the plurality of computing devices may include front end computing devices that are in communication with one or more back end computing devices of the cloud service.

At 604, the process 600 may encapsulate the data packet to produce an encapsulated data packet. In some examples, the switch may encapsulate the data packet based at least in part on a tunneling protocol. For instance, the tunneling protocol may comprise Virtual Extensible Local Area Network (VXLAN) tunneling technology. The encapsulated data packet may include one or more fields, such as a second destination IP address corresponding to a computing device of the plurality of computing devices of the cloud service. In some instances, the second destination IP address may be a private IP address of the computing device of the cloud service. Furthermore, the one or more fields of the encapsulated data packet may include a tunneling protocol identifier (ID) associated with the cloud service. In some instances, the tunneling protocol ID may be a VXLAN ID associated with the cloud service.

At 606, the process 600 may send, to one or more computing devices of the cloud service, the encapsulated data packet via an express route that bypasses one or more load balancers. For instance, the switch may send the encapsulated data packet to a front end computing device of the cloud service. By sending the encapsulated data packet via the express route that bypasses one or more load balancers of the cloud service, the encapsulated data packet may reach the front end computing device without imposing a network traffic load on the one or more load balancers.

Figure 7:
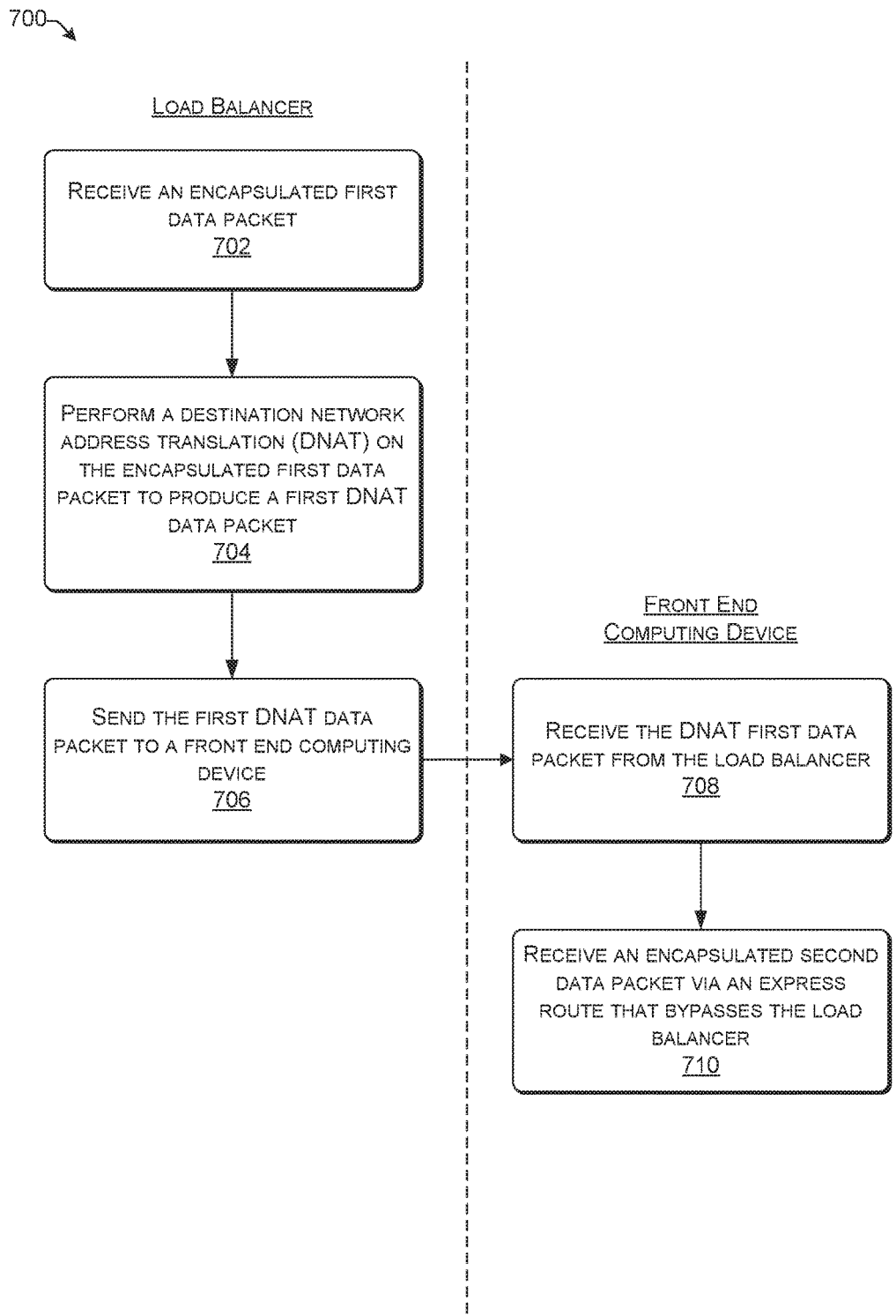
FIG. 7 is a flow diagram illustrating another example process for transmitting data between a virtual machine and a cloud service computing device via an express route according to some implementations.

FIG. 7 is a flow diagram illustrating another example process 700 for transmitting data between a virtual machine (VM) and a cloud service computing device via an express route according to some implementations, as further described above with reference to FIGS. 1-5.

At 702, the process 700 may receive an encapsulated first data packet. For instance, a load balancer of a cloud service may receive the encapsulated first data packet from a host computing device that hosts a VM. The encapsulated first data packet may include one or more fields of a first data packet, and one or more encapsulation fields that encapsulate the one or more fields of the first data packet. In some examples, the one or more encapsulation fields may encapsulate the one or more fields of the first data packet based at least in part on a cloud tunneling protocol. For example, the cloud tunneling protocol may comprise Virtual Extensible Local Area Network (VXLAN) tunneling technology. The one or more encapsulation fields may include, for instance, a tunneling protocol identifier (ID) associated with the cloud service and a first destination internet protocol (IP) address associated with the cloud service. For example, the tunneling protocol ID may be a VXLAN ID.

At 704, the process 700 may perform a destination network address translation (DNAT) on the encapsulated first data packet to produce a DNAT first data packet. For instance, the load balancer may perform the DNAT on the encapsulated first data packet. In performing the DNAT on the encapsulated first data packet, the load balancer may replace the first destination IP address with a second destination IP address. For instance, the second destination IP address may be associated with a front end computing device of the cloud service.

At 706, the process 700 may send the DNAT first data packet to a front end computing device of the cloud service. For instance, the load balancer may send the DNAT first data packet to the front end computing device based at least in part on the second destination IP address associated with the front end computing device.

At 708, the process 700 may receive the DNAT first data packet from the load balancer. For instance, the front end computing device may receive the DNAT first data packet from the load balancer during a first time period after the load balancer performs the DNAT on the encapsulated first data packet.

At 710, the process 700 may receive an encapsulated second data packet via an express route that bypasses the load balancer. In some cases, the front end computing device may receive the encapsulated second data packet from the host computing device that hosts the VM. For instance, the VM may generate a second data packet destined for the cloud service. The VM may send the second data packet to a switch. In some examples, the switch may be a virtual switch that is hosted by the host computing device. The switch may access a flow table and determine, based at least in part on information included in the second data packet and information included in the flow table, to send the second data packet to the front end computing device via the express route that bypasses the load balancer. The switch may encapsulate the second data packet to produce the encapsulated second data packet. In some instances, the switch may encapsulate the second data packet based at least in part on the cloud tunneling protocol. Furthermore, the encapsulated second data packet may include a tunneling protocol identifier (ID) associated with the cloud service and a destination IP address associated with the front end computing device.

In some examples, the front end computing device may receive the encapsulated second data packet during a second time period after the first time period noted above with respect to receiving the DNAT first data packet.

Figure 8:
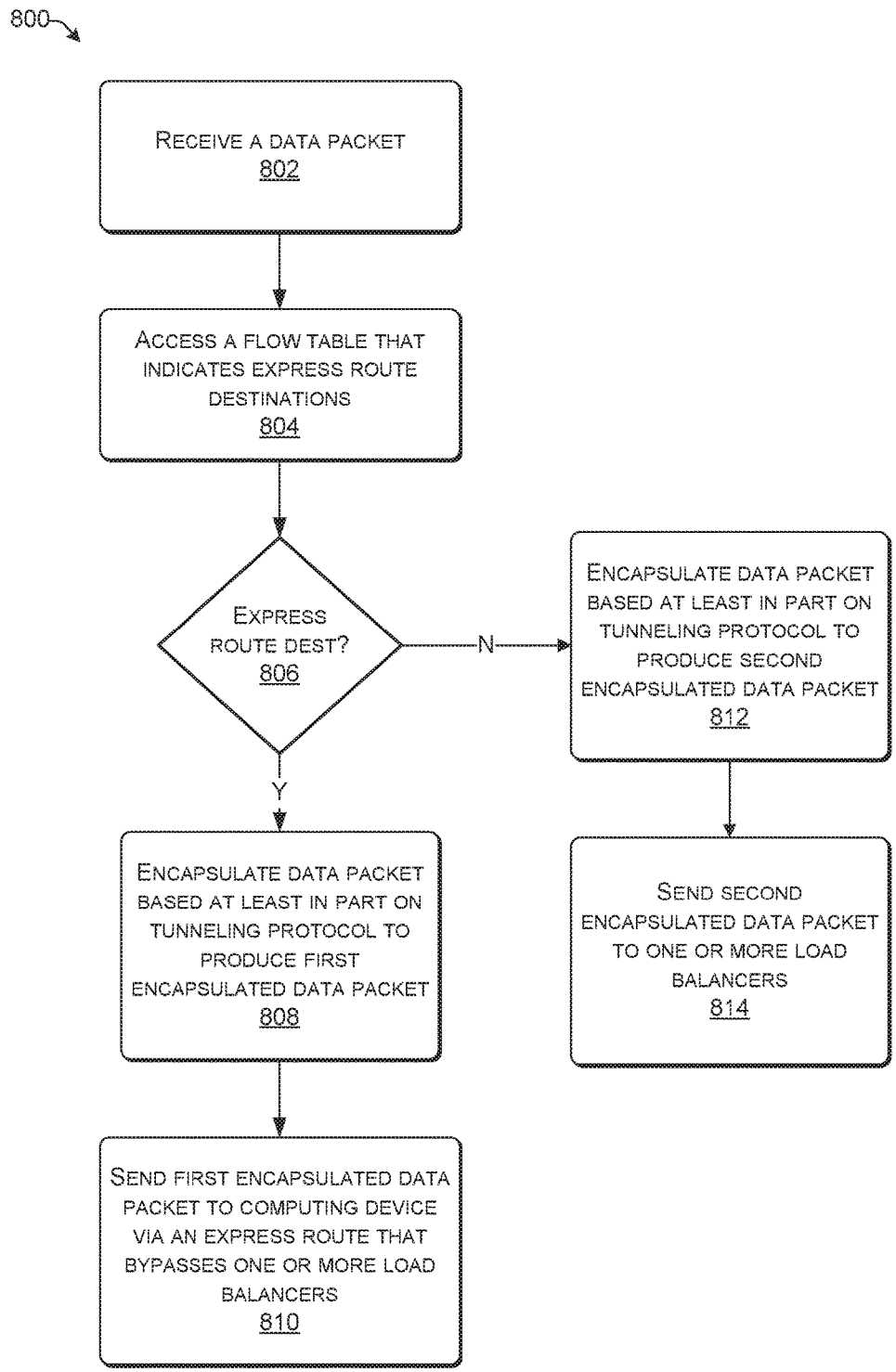
FIG. 8 is a flow diagram illustrating an example process for using a flow table in transmitting data between a virtual machine and a cloud service computing device according to some implementations.

FIG. 8 is a flow diagram illustrating an example process 800 for using a flow table in transmitting data between a virtual machine (VM) and a cloud service computing device according to some implementations, as further described above with reference to FIGS. 1-5. In some cases, the process 800 may be performed by a switch (e.g., a virtual switch). However, the process 800, or a portion thereof, may be performed by any suitable device.

At 802, the process 800 may receive a data packet. For instance, the VM may generate the data packet and send the data packet to the switch.

At 804, the process 800 may access a flow table that indicates express route destinations. For instance, the switch may access a flow table that indicates one or more destination IP addresses that are mapped to one or more computing devices of the cloud service, and the one or more computing devices may be designated as express route destinations for data packets.

At 806, the process 800 may determine whether a destination internet protocol (IP) address of the data packet is indicated in the flow table as corresponding to an express route destination.

If, at 806, the process 800 determines that the destination IP address of the data packet corresponds to an express route destination, then the process 800 may encapsulate the data packet based at least in part on a tunneling protocol (e.g., a Virtual Extensible Local Area Network (VXLAN) tunneling protocol) to produce a first encapsulated data packet, at 808. For instance, the data packet may include, as a destination IP address, a public IP address associated with the cloud service. The flow table may indicate a mapping between the public IP address associated with the cloud service to a private IP address associated with a computing device (e.g., a front end computing device) of the cloud service.

The switch may encapsulate the data packet to include one or more encapsulation fields. The one or more encapsulation fields may include, as a destination IP address, the private IP address associated with the computing device of the cloud service. Furthermore, the one or more encapsulation fields may include a tunneling protocol identifier (ID), such as a VXLAN ID that is associated with the cloud service.

At 810, the process 800 may send the first encapsulated data packet to the computing device of the cloud service via an express route that bypasses one or more load balancers of the cloud service. For instance, the switch may send the first encapsulated data packet to a front end computing device of the cloud service. By sending the first encapsulated data packet via the express route that bypasses one or more load balancers of the cloud service, the first encapsulated data packet may reach the front end computing device without imposing a network traffic load on the one or more load balancers.

If, at 806, the process 800 determines that the destination IP address of the data packet does not correspond to an express route destination, then the process 800 may encapsulate the data packet based at least in part on the tunneling protocol to produce a second encapsulated data packet, at 812. For instance, the flow table may not indicate a mapping between the public IP address associated with the cloud service to a private IP address associated with the computing device of the cloud service. The second encapsulated data packet may be different than the first encapsulated data packet.

The switch may encapsulate the data packet to include one or more encapsulation fields. The one or more encapsulation fields of the second encapsulated data packet may include, as a destination IP address, a private IP address associated with a load balancer of the cloud service. Furthermore, the one or more encapsulation fields may include a tunneling protocol identifier (ID), such as a VXLAN ID that is associated with the cloud service.

At 814, the process 800 may send the second encapsulated data packet to one or more load balancers of the cloud service. For instance, the switch may send the second encapsulated data packet to a load balancer of the cloud service, and the load balancer may forward the second encapsulated data packet to a front end computing device of the cloud service. In some cases, the load balancer may perform a destination network address translation (DNAT) on the second encapsulated data packet to produce a second DNAT data packet. The second DNAT data packet may include, as a destination IP address, a private IP address associated with the front end computing device of the cloud service. The load balancer may thus send the second DNAT data packet to the front end computing device.

Figure 9:
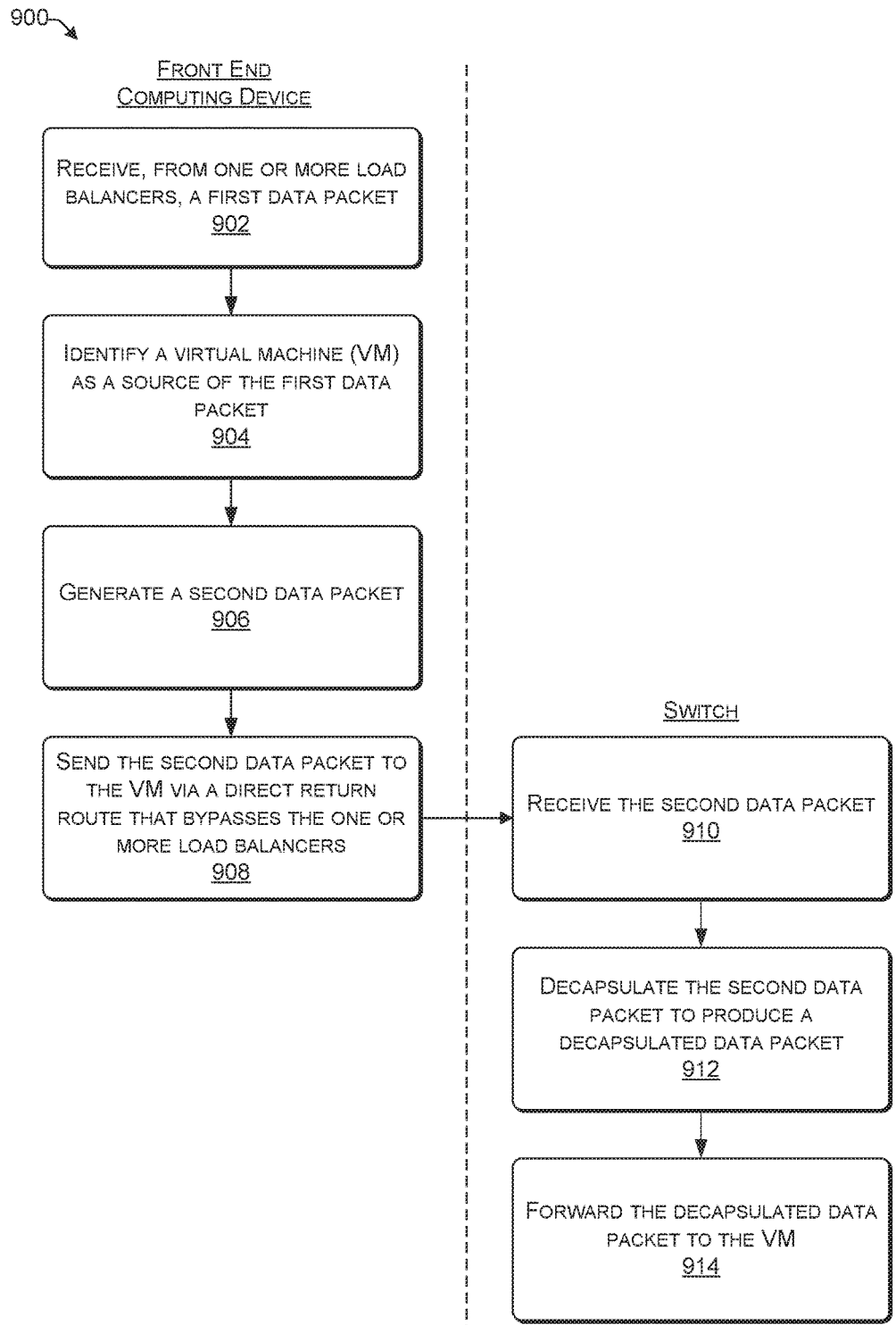
FIG. 9 is a flow diagram illustrating an example process for transmitting data between a cloud service computing device and a virtual machine (VM) via a direct return route according to some implementations.

FIG. 9 is a flow diagram illustrating an example process 900 for transmitting data between a cloud service computing device and a virtual machine (VM) via a direct return route according to some implementations, as further described above with reference to FIGS. 1-5.

At 902, the process 900 may receive, from one or more load balancers, a first data packet. For instance, a front end computing device of a cloud service may receive the first data packet from a load balancer of the cloud service.

At 904, the process 900 may identify the VM as a source of the first data packet. For instance, the first data packet may include, as a source internet protocol (IP) address, a private IP address associated with the VM. The front end computing device may obtain, from the first data packet, information about the VM (e.g., the private IP address associated with the VM) and use that information to send data packets to the VM via a direct route that bypasses the load balancer rather than sending data packets to the VM through the load balancer.

At 906, the process 900 may generate a second data packet. For instance, the first data packet may include a request from the VM. The front end computing device may generate the second data packet, and the second data packet may include a response to the request of the first data packet. However, in other instances, the second data packet may have no connection with the first data packet.

At 908, the process 900 may send the second data packet to the VM via a direct return route that bypasses the one or more load balancers. For instance, the front end computing device may send the second data packet to the VM via a direct return route that bypasses the load balancer. Before sending the second data packet, the front end computing device may encapsulate the second data packet based at least in part on a cloud tunneling protocol (e.g., a Virtual Extensible Local Area Network (VXLAN) tunneling protocol). Furthermore, the front end computing device may send the second data packet to the VM via a cloud tunnel (e.g., a VXLAN tunnel).

At 910, the process 900 may receive the second data packet. In some cases, a switch (e.g., a virtual switch) may receive the second data packet. The switch and the VM may be hosted by a same host computing device.

At 912, the process 900 may decapsulate the second data packet to produce a decapsulated data packet. For instance, the switch may decapsulate the second data packet. The switch may, based on information from the second data packet and/or the decapsulated data packet, determine that a private IP address associated with the VM is indicated as a destination of the second data packet. Accordingly, at 914, the process 900 may forward the decapsulated data packet to the VM. For example, the switch may forward the decapsulated data packet to the VM.

In some cases, the switch, after obtaining information from the second data packet and/or the decapsulated data packet, may access a flow table and determine that the front end computing device of the cloud service is not indicated as an express route destination. Thus, the switch may modify the flow table, or cause the flow table to be modified, such that the front end computing device is designated as an express route destination. For instance, the switch may modify the flow table such that a private IP address associated with the front end computing device is mapped to a public IP address associated with the cloud service. As such, the switch may send subsequent data packets, that originate from the VM and that are destined for the cloud service, to the front end computing device via an express route that bypasses the load balancer.

Figure 10:
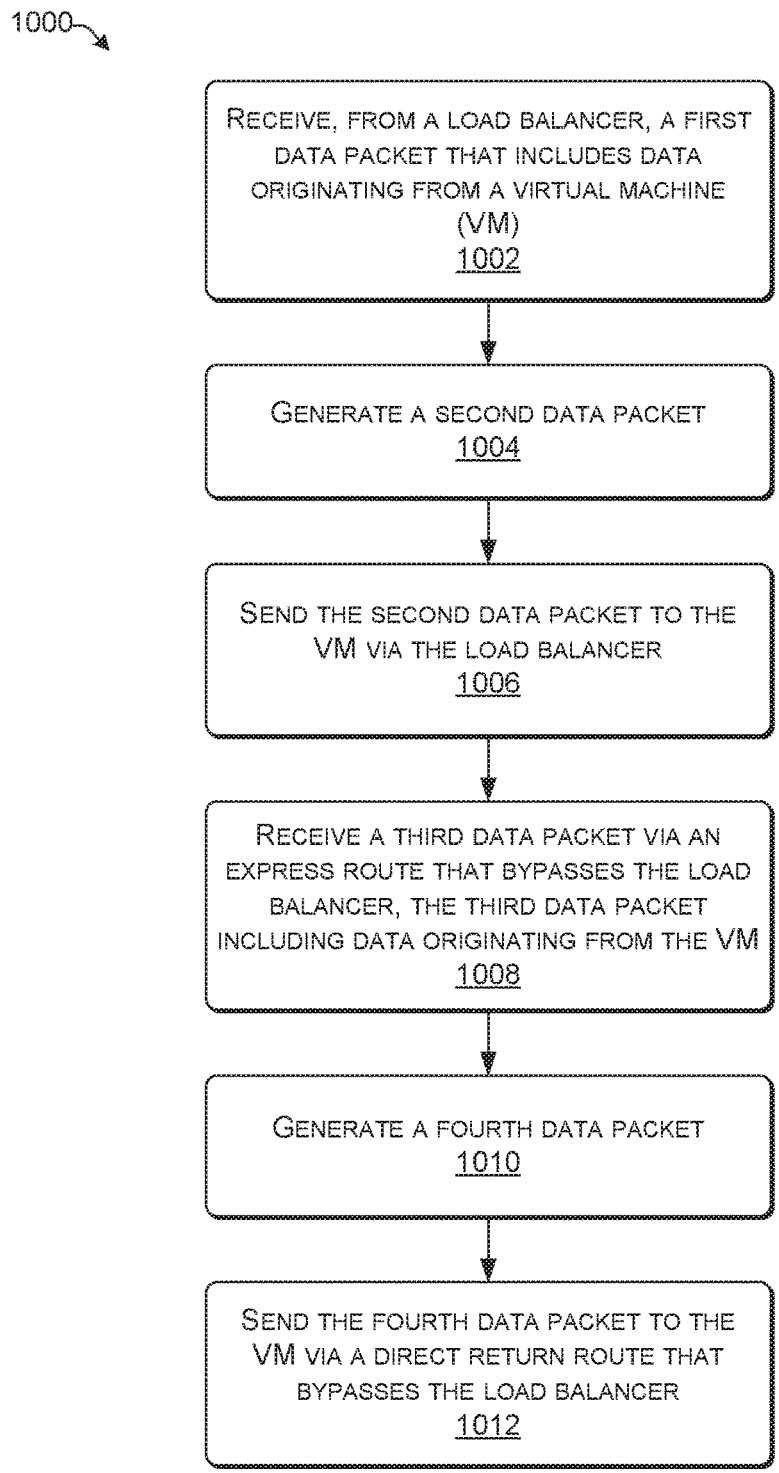
FIG. 10 is a flow diagram illustrating an example process for transmitting data between a virtual machine (VM) and a cloud service computing device via an express route and a direct return route according to some implementations.

FIG. 10 is a flow diagram illustrating an example process 1000 for transmitting data between a virtual machine (VM) and a cloud service computing device via an express route and a direct return route according to some implementations, as further described above with reference to FIGS. 1-5. In some cases, the process 1000 may be performed by the cloud service computing device (e.g., a front end computing device of the cloud service). However, the process 1000, or a portion thereof, may be performed by any suitable device.

At 1002, the process 1000 may receive a first data packet that includes data originating from the VM. For instance, a front end computing device of the cloud service may receive the first data packet from a load balancer of the cloud service.

At 1004, the process 1000 may generate a second data packet. Then, at 1006, the process 1000 may send the second data packet to the VM via the load balancer. For instance, the front end computing device of the cloud service may generate the second data packet and send the second data packet to the VM via the load balancer.

At 1008, the process 1000 may receive a third data packet via an express route that bypasses the load balancer. The third data packet may include data originating from the VM. For instance, the VM may send the third data packet to the front end computing device based at least in part on a cloud tunneling protocol (e.g., a Virtual Extensible Local Area Network (VXLAN) tunneling protocol).

At 1010, the process 1000 may generate a fourth data packet. Then, at 1012, the process 1000 may send the fourth data packet to the VM via a direct return route that bypasses the load balancer. For instance, the front end computing device may determine, based at least in part on information obtained from at least one of the first data packet or the third data packet, to send the fourth data packet to the VM via the direct return route.

In some examples, the third data packet received via the express route and the fourth data packet sent via the direct return route may each include the same tunneling protocol identifier (ID). For instance, the third data packet and the fourth data packet may each include the same VXLAN ID that is associated with the cloud service. However, in other examples, third data packet may include a first VXLAN ID and the fourth data packet may include a second VXLAN ID that is different than the first VXLAN ID.

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A system, comprising:
   a plurality of front end computing devices of a cloud service;
   a virtual machine (VM) having access to a virtual switch via which data is transmitted, the virtual switch being configured to route a first data packet that includes:
      one or more fields, and
      one or more encapsulation fields that encapsulate the one or more fields of the first data packet, the one or more encapsulation fields including a tunneling protocol identifier (ID) associated with the cloud service and a first destination internet protocol (IP) address associated with the cloud service; and
   a load balancer configured to:
      receive the first data packet,
      perform a destination network address translation (DNAT) on the first data packet by replacing the first destination IP address with a second destination IP address to produce a DNAT first data packet, the second destination IP address being associated with a particular front end computing device of the plurality of front end computing devices, and
      send the DNAT first data packet to the particular front end computing device,
   wherein the virtual switch of the VM is configured to:
      access an express route flow table which indicates that the particular front end computing device has previously received the first data packet from the VM, and
      determine, based on the express route flow table, whether to encapsulate a second data packet from the VM destined for the particular front end computing device for an express route so as to bypass the load balancer.

2. The system of claim 1, wherein the cloud tunneling protocol comprises Virtual Extensible Local Area Network (VXLAN) tunneling technology.

3. The system of claim 1, wherein the VM sends the first data packet to the virtual switch.

4. The system of claim 3, wherein the express route flow table further indicates one or more destination IP addresses that are mapped to one or more front end computing devices designated as express route destinations for data packets, and
   wherein, when determined that the express route flow table does not indicate the destination IP address of a particular data packet, the virtual switch:
      encapsulates the one or more fields of the particular data packet with the one or more encapsulation fields to produce an encapsulated particular data packet, the encapsulating including using, based at least in part on the determining that the express route flow table does not indicate the destination IP address of the particular data packet, a first IP address associated with the load balancer as the first destination IP address of the one or more encapsulation fields, and sends the encapsulated particular data packet to the load balancer.

5. The system of claim 4, wherein the front end computing device is configured to:
receive the DNAT first data packet from the load balancer during a first time period that occurs after the load balancer performs the DNAT on the first data packet, and
receive, during a second time period after the first time period, an encapsulated second data packet directly via the express route between the VM and the front end computing device.

6. The system of claim 1, wherein
in the one or more fields of the first data packet, the source IP address is a private IP address of the VM and the first destination IP address is a public IP address of the cloud service,
in the one or more encapsulation fields of the encapsulated data packet, the second destination IP address is a private IP address of the computing device, and
the one or more encapsulation fields of the encapsulated data packet further include a tunneling protocol identifier (ID) associated with the cloud service.

7. The system of claim 1, wherein the virtual switch is further configured to:
receive a response data packet that indicates a private IP address of the particular front end computing device as a source of the response data packet; and
designate the particular front end computing device as an express route destination based at least partly in response to the receiving the response data packet.

8. An apparatus, comprising:
one or more processors,
memory, coupled to the one or more processors, the memory storing thereon computer-readable instructions executable by one or more processors, that when executed by the one or more processors, causes the one or more processors to perform acts including:
receiving, via a load balancer, a first data packet, the first packet including one or more fields and one or more encapsulation fields, one or more encapsulation fields encapsulating the one or more fields of the first data packet, the one or more encapsulation fields including a tunneling protocol identifier (ID) associated with the cloud service and a first destination internet protocol (IP) address associated with the cloud service;
performing, via the load balancer, a destination network address translation (DNAT) on the first data packet by replacing a first destination IP address with a second destination IP address to produce a DNAT first data packet, the second destination IP address being associated with the particular front end computing device of a plurality of front end computing devices; and
sending, via the load balancer, the DNAT first data packet to the particular front end computing device;
accessing, via a virtual switch, an express route flow table which indicates whether a particular front end computing device has previously received the first data packet from the VM,
determining, via the virtual switch, based on the express route flow table, whether to encapsulate a second data packet from the VM destined for the particular front end computing device for an express route so as to bypass a load balancer of the cloud service.

9. The apparatus of claim 8, wherein the tunneling protocol comprises Virtual Extensible Local Area Network (VXLAN) tunneling technology.

10. The apparatus of claim 8, the acts further comprising sending, via the VM, the first data packet to the virtual switch.

11. The apparatus of claim 8, wherein the express route flow table further indicates one or more destination IP addresses that are mapped to one or more front end computing devices designated as express route destinations for data packets, and
wherein, when determined that the express route flow table does not indicate the destination IP address of a particular data packet, the acts further comprising:
encapsulating, via the virtual switch, one or more fields of the particular data packet with one or more encapsulation fields to produce an encapsulated particular data packet, the encapsulating including using, based at least in part on the determination that the express route flow table does not indicate the destination IP address of the particular data packet, a first IP address associated with the load balancer as the first destination IP address of the one or more encapsulation fields, and
sending, via the virtual switch, the encapsulated particular data packet to the load balancer.

12. The apparatus of claim 8, the acts further comprising:
receiving, via the particular front end computing device, the DNAT first data packet from the load balancer during a first time period that occurs after the load balancer performs the DNAT on the first data packet, and
receiving, via the particular front end computing device, during a second time period after the first time period, an encapsulated second data packet directly via the express route between the VM and the particular front end computing device.

13. A method, comprising:
receiving a first data packet, wherein the first data packet has one or more fields including a source internet protocol (IP) address associated with a virtual machine (VM) and a first destination IP address associated with a cloud service;
accessing, via a virtual switch, an express route flow table which indicates whether a particular front end computing device has previously received the first data packet from the VM in the cloud service,
determining, based on the express route flow table, whether to encapsulate a second data packet from the VM destined for the particular front end computing device for an express route so as to bypass one or more load balancers of the cloud service;
encapsulating, based at least in part on a tunneling protocol, the second data packet to produce an encapsulated data packet that has one or more encapsulation fields including a second destination IP address corresponding to the particular front end computing device, upon determining to encapsulate the second data packet; and
sending, based at least in part on the tunneling protocol, the encapsulated data packet to the particular front end computing device via the express route that bypasses the one or more load balancers.

14. The method of claim 13, wherein the tunneling protocol comprises Virtual Extensible Local Area Network (VXLAN) tunneling technology.

15. The method of claim 14, wherein the one or more encapsulation fields further include a VXLAN identifier (ID) associated with the public cloud service.

16. The method of claim 13, wherein the encapsulating is performed by the virtual switch.

17. The method of claim 13, wherein:
in the one or more fields of the first data packet, the source IP address is a private IP address of the VM and the first destination IP address is a public IP address of the cloud service,
in the one or more encapsulation fields of the encapsulated data packet, the second destination IP address is a private IP address of the computing device, and
the one or more encapsulation fields of the encapsulated data packet further include a tunneling protocol identifier (ID) associated with the cloud service.

18. The method of claim 13, further comprising determining that the particular front end computing device has been designated as an express route destination.

19. The method of claim 18, wherein the express route flow table further indicates one or more IP addresses that are mapped to one or more computing devices designated as express route destinations for data packets, and
wherein the determining that the particular front end computing device has been designated as an express route destination is based at least in part on the accessing the express route flow table.

20. The method of claim 13, further comprising:
receiving, via the virtual switch, a response data packet that indicates a private IP address of the particular front end computing device as a source of the response data packet; and
designating the particular front end computing device as an express route destination based at least partly in response to the receiving the response data packet.

* * * * *